(12) United States Patent
Ji et al.

(10) Patent No.: US 9,575,196 B2
(45) Date of Patent: Feb. 21, 2017

(54) COHERENT NOISE ATTENUATION

(71) Applicant: WESTERNGECO L.L.C., Houston, TX (US)

(72) Inventors: Ying Ji, Katy, TX (US); Julian Edward Kragh, Great Bardfield (GB); Ali Özbek, Milton (GB)

(73) Assignee: WESTERNGECO L.L.C., Houston, TX (US)

( * ) Notice: Subject to any disclaimer, the term of this patent is extended or adjusted under 35 U.S.C. 154(b) by 435 days.

(21) Appl. No.: 14/358,724

(22) PCT Filed: Nov. 14, 2012

(86) PCT No.: PCT/IB2012/056422
§ 371 (c)(1),
(2) Date: May 15, 2014

(87) PCT Pub. No.: WO2013/072861
PCT Pub. Date: May 23, 2013

(65) Prior Publication Data
US 2014/0316709 A1  Oct. 23, 2014

Related U.S. Application Data

(60) Provisional application No. 61/561,350, filed on Nov. 18, 2011.

(51) Int. Cl.
*G06F 19/00* (2011.01)
*G01V 1/36* (2006.01)

(52) U.S. Cl.
CPC .............. *G01V 1/364* (2013.01); *G01V 1/36* (2013.01); *G01V 2210/32* (2013.01); *G01V 2210/3246* (2013.01)

(58) Field of Classification Search
CPC .............. G01V 1/364; G01V 2210/32; G01V 2210/3246
(Continued)

(56) References Cited

U.S. PATENT DOCUMENTS 3,564,494 A    2/1971  Frasier et al.
5,067,112 A   11/1991  Meek et al.
(Continued)

FOREIGN PATENT DOCUMENTS

GB       2004648 A       4/1979
WO     2011045641       4/2011

OTHER PUBLICATIONS

Peacock, "On the Practical Design of Discrete Velocity Filters for Seismic Data Processing", Feb. 1, 1982, New York, USA, IEEE Transactions on Acoustics, Speech and Signal Processing, vol. ASSP-30, No. 1, pp. 52-60.
(Continued)

*Primary Examiner* — Edward Raymond (57) ABSTRACT

Methods and apparatuses for processing seismic data to generate images or determine properties of an interior section of the Earth. The seismic data is processed to filter coherent noise such as ground roll noise from seismic survey data. The noise is attenuated using 3D and/or 2D fan filters, which may have combined low-pass and band-pass filters derived from signal decomposition. The filters are designed with selected operator length, velocity bands of signals and noises and frequency range for a primary trace and adjacent traces within the operator length. The data is decomposed with the filters into signals and noises, and the noises are then filtered from the decomposed data. The process may be repeated for various frequencies and traces within the seis-
(Continued)

mic data. The methods may be used for surveys that have either regular or irregular seismic receiver or seismic source positions.

21 Claims, 8 Drawing Sheets (58) Field of Classification Search
USPC .................. 702/17, 16, 13, 14, 182–185
See application file for complete search history.

(56) References Cited

U.S. PATENT DOCUMENTS

| | | | |
|---|---|---|---|
| 5,191,526 | A | 3/1993 | Laster et al. |
| 6,058,074 | A | 5/2000 | Swan et al. |
| 6,961,283 | B2 | 11/2005 | Kappius et al. |
| 7,953,556 | B2 | 5/2011 | Craft et al. |
| 2003/0198132 | A1 | 10/2003 | Kappius et al. |
| 2006/0287830 | A1* | 12/2006 | Tang ............... G01V 1/364 702/13 |
| 2011/0060528 | A1 | 3/2011 | Özbek et al. |
| 2011/0082647 | A1 | 4/2011 | Edme et al. |

OTHER PUBLICATIONS

Robinson, "HRVA-A Velocity Analysis Technique Applied to Seismic Data", Jun. 1, 1969, Geophysics, vol. 34, No. 3, pp. 330-356.
McCowan, et al., "Fan Filters for Data with Variable Spatial Sampling", Dec. 1, 1984, New York, USA, IEEE Transactions on Acoustics, Speech and Signal Processing, vol. ASSP-32, No. 6, pp. 1154-1159.
Office Action issued in related EP application 12850270.5 on Jun. 10, 2016, 6 pages.
European Search Report issued in related EP application 12850270.5 on May 27, 2016, 6 pages.
International Search Report of PCT Application No. PCT/IB2012/056422 dated Apr. 16, 2013: pp. 1-2.
Embree et al., "Wide-Band Velocity Filtering—The Pie-Slice Process." Geophysics, Dec. 1963, vol. 28(6): pp. 948-974.
Gaiser, "3-D prestack f-x coherent noise suppression," pp. 1354-1357.
Özbek et al., "P171: 3-D Filter Design on a Hexagonal Grid for Point-Receiver Land Acquisition," EAGE 66th Conference & Exhibition, Jun. 2004: pp. 1-4.
Özbek et al., "A21: 3-D Filter Design on a Hexagonal Grid for Point-Receiver Land Acquisition," EAGE Fall Research Workshop on Advances in Seismic Acquisition Technology, Sep. 2004: pp. 1-4.
Phinney et al., "Transformation and Analysis of Record Sections," Journal of geophysical Research, Jan. 10, 1981, vol. 86(B1): pp. 359-377.
Decision of Grant issued in the related RU application 201424710, dated Sep. 2, 2016 (10 pages).

* cited by examiner

COHERENT NOISE ATTENUATION

CROSS-REFERENCE TO RELATED APPLICATIONS

This application is, pursuant to 35 U.S.C. §371, the U. S. national stage of Patent Cooperation Treaty Application No. PCT/IB2012/056422 filed Nov. 14, 2012, which claims the benefit of U.S. Provisional Patent Application Ser. No. 61/561,350, filed on Nov. 18, 2011, the disclosure of which is incorporated by reference herein in its entirety.

BACKGROUND

This disclosure relates to seismic surveys and seismic exploration for oil and gas. In particular, but not by way of limitation, this disclosure relates to noise attenuation of seismic surveys and noise attenuation using two dimensional ("2D") and three dimensional ("3D") fan filters.

Seismic exploration involves surveying subterranean geological formations for hydrocarbon deposits. A survey may involve deploying seismic source(s) and seismic sensors at predetermined locations. The sources generate seismic waves, which propagate into geological formations creating pressure changes and vibrations along the way. Changes in elastic properties of the geological formation scatter the seismic waves, changing the direction of propagation and other properties of the seismic waves. In a seismic survey, part of the energy emitted by the seismic sources reaches the seismic sensors. Some seismic sensors are sensitive to pressure changes (e.g., hydrophones), other seismic sensors are sensitive to particle motion (e.g., geophones). Seismic surveys may deploy one type of sensor or a combination both types of sensors. In response to the detected seismic events, the seismic sensors generate seismic data, generally, in the form of electrical signals. Analysis of the seismic data may indicate the presence or absence of probable locations of hydrocarbon deposits.

Some seismic surveys are known as "marine" surveys because the survey is conducted in a marine environment. However, "marine" surveys may not only be conducted in saltwater environments, they may also be conducted in fresh water and brackish water environments. In one type of marine survey, called a "towed-array" survey, an array of seismic sensor-containing streamers and sources is towed behind a survey vessel.

Other seismic surveys are known as "land" surveys because the surveys are conducted on land environments. Land surveys may use dynamite, seismic vibrators and/or the like as sources. In land surveys, arrays of seismic sensor-containing cables/seismic sensors are laid on the ground to receive seismic signals/waves generated by the seismic sources. The seismic signals may be converted, digitized, stored or transmitted by sensors to data storage and/or processing facilities nearby, e.g. a recording truck. Land surveys may also use wireless receivers to avoid the limitations of cables. Seismic surveys may be conducted in areas between land and sea, which is referred to as the "transition zone". Other types of seismic surveys, incorporating both hydrophones and geophones, may be conducted on the seabed.

In seismic surveys, the seismic data generated by the seismic receivers may be masked by noise, such as surface related noise, e.g. strong and dispersive ground roll and scattered ground roll. One of the data processing tasks with respect to seismic data from a seismic survey is to attenuate noise in the seismic data without distorting the seismic signals.

Many methods for attenuating noise in seismic data have previously been proposed and used. For example, techniques such as wide-band velocity filtering, transformation and analysis of record sections, 3-D prestack f-x coherent noise suppression and 3-D filter design for use on a hexagonal grid are some example methods for noise attenuation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure relates to methods and apparatuses for attenuation of coherent noise, such as surface related noises (ground roll and/or scattered ground roll noise), in seismic surveys. Embodiments of the present invention use 2D and/or 3D fan filters to attenuate the coherent noise. In some aspects, the methods are performed in a frequency-space domain. In embodiments of the present invention, the fan filters are combined low-pass and band-pass filters derived from signal decomposition and may be spectra specific.

In some embodiments, the filters may be designed with selected operator length, velocity bands of signals and noises, and frequency range for a primary trace, and adjacent traces within the operator length. The data may be decomposed with the filters into signals and noises, where the noises are filtered. In some embodiments, the noise attenuation/decomposition process may be repeated for various frequencies and traces within the data. The methods in accordance with embodiments of the present invention may be used for surveys with either regular positions or irregular positions of the seismic receivers or sources.

BRIEF DESCRIPTION OF DRAWINGS

Embodiments of this disclosure are described with reference to the following figures. The same numbers are used throughout the figures to reference like features and components. A better understanding of the methods or apparatuses can be had when the following detailed description of the several embodiments is considered in conjunction with the following drawings, in which.

DETAILED DESCRIPTION

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well-known methods, procedures, components, and systems have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 1:
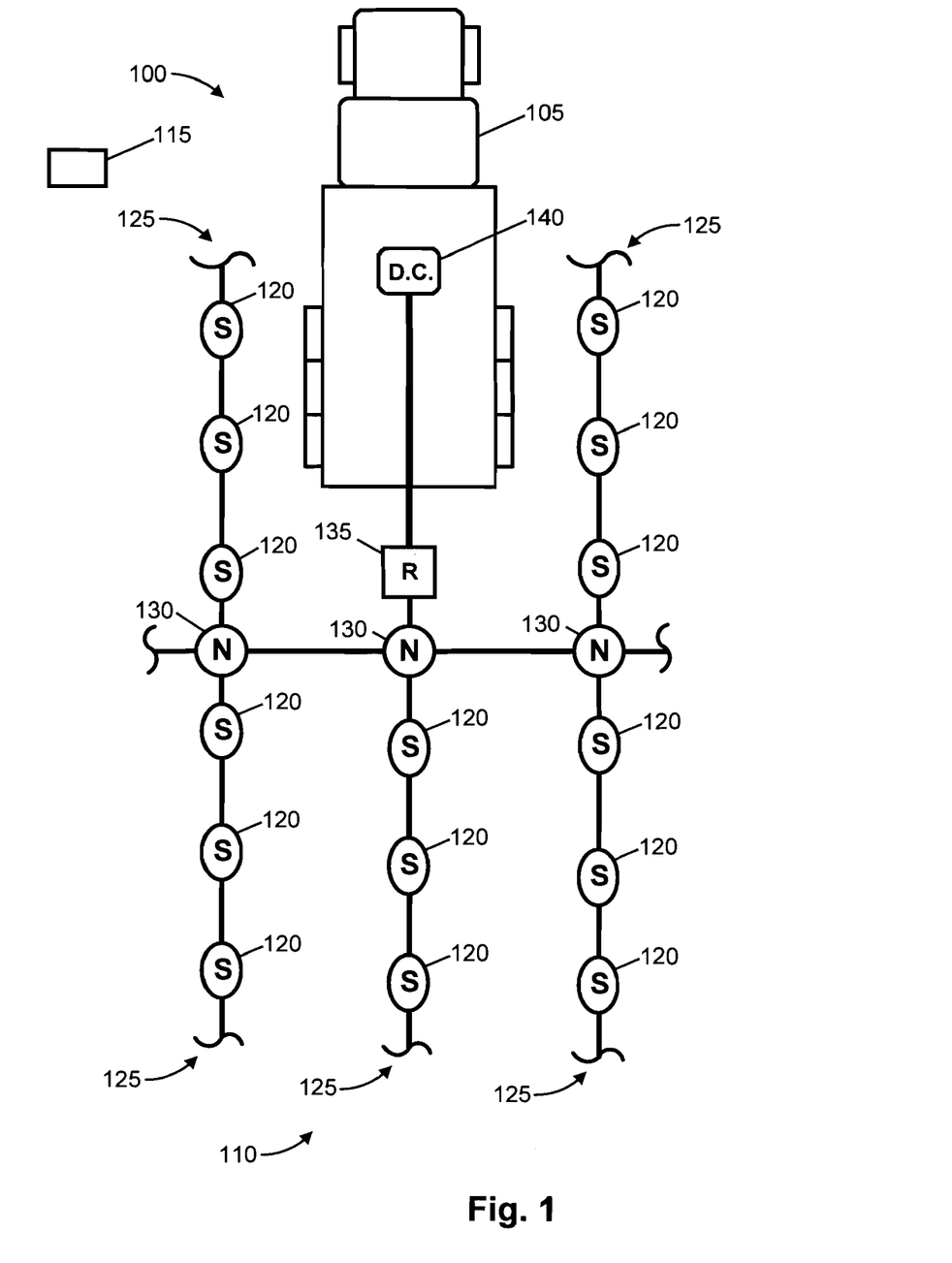
FIG. 1 illustrates a seismic acquisition system in a land environment such as may be used in an embodiment of the present invention.

FIG. 1 depicts a land-based seismic survey system 100 such as may be used in an embodiment of the present invention. The seismic survey system 100 may include a recording truck 105 connected to a seismic array 110, which is a recording array. The recording array 110 includes a plurality of seismic data sources 120, such as, for example, seismic sources (e.g., vibrators, explosive charges and/or the like), positioning sensors (Global Positioning System ("GPS") sensors), seismic receivers (geophones), and/or the like, on a plurality of lines 125. Seismic sources, e.g., a seismic vibrator 115, may in some aspects not be part of the recording array 110 and may be independent thereof. The recording array 110 may in some aspects include a plurality of nodes 130 and at least one router 135.

Figure 9:
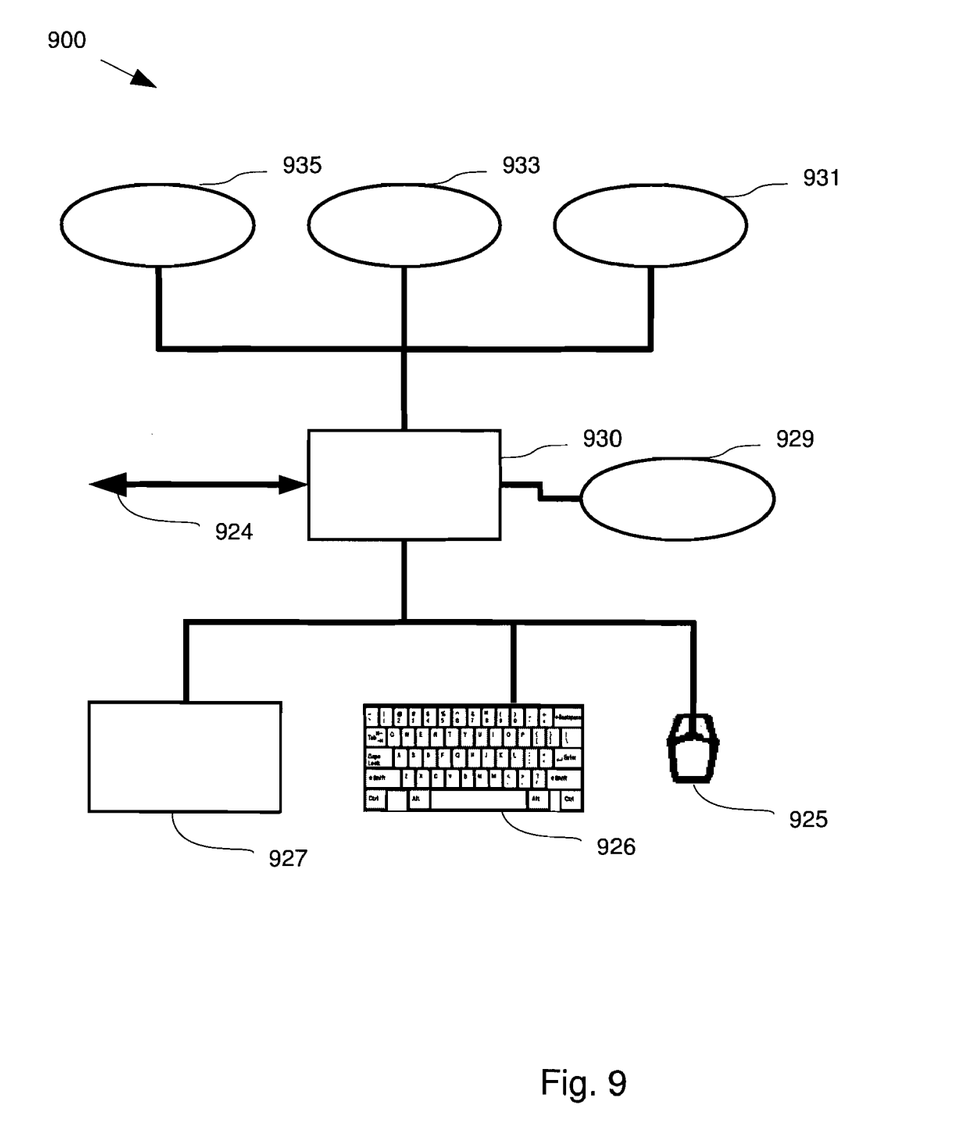
FIG. 9 illustrates a schematic view of a computer system for use in noise attenuation, in accordance with an embodiment of the present invention.

In an embodiment of the present invention, the seismic survey system 100 may include at least one data collection system 140, which may be located in the recording truck 105. The recording truck 105 may contain a rack-mounted computing apparatus, as illustrated in FIG. 9, with which at least a portion of data collection system 140 is implemented.

There are many survey geometric arrangements for 2D or 3D seismic surveys. In 2D survey arrangement, receivers and sources are arranged on a single line, e.g. along a vertical line, as shown in FIG. 1. In a 3D survey arrangement, for example, data points 120 as illustrated in FIG. 1, are receiver positions, while a source may be placed anywhere in the area. This 3D arrangement may be referred to as an areal array survey. In another 3D survey, the receivers are placed along one line in one direction (e.g. one of the vertical lines in FIG. 1) and the sources are placed along another line that is perpendicular to the receiver line (e.g. one of the horizontal lines in FIG. 1). This arrangement may be referred to as a cross-spread point receiver survey. There are many other 2D and 3D survey arrangements in which the sources and receivers may be arranged in many different ways.

During a seismic survey, reflection signals from a subsurface earth structure(s) may be desired signals/signals of interest, whereas other signals in the seismic data may be considered unwanted noise. One type of noise is ground roll, which noise is related to waves travelling close to the surface of the earth.

The methods and systems disclosed herein relate to attenuation of the ground roll and scattered ground roll, while preserving reflection signals. However, the described methods and systems are not limited to ground roll and scattered ground roll in land seismic signals and may be used to attenuate other kinds of noise in marine and/or land seismic surveys. As such, methods and systems according to the present invention may be used to attenuate coherent noise or the like in ocean bottom and in marine seismic data or even other non-seismic digital signals.

In a seismic survey such as depicted in FIG. 1, assuming an areal array of K geophones—e.g. the array 110 having many data source points/geophones 120—available to measure the seismic data, the measured seismic data $d(\omega,r_i)$ at frequency $\omega$ and position $r_i$ can be modeled as:

$$d(\omega,r_i)=s(\omega,r_i)+c(\omega,r_i)+r(\omega,r_i) \quad \text{Eq. 1}$$

where:
$s(\omega,r_i)$ is the desired reflection signal;
$c(\omega,r_i)$ is the coherent noise, and
$r(\omega,r_i)$ is the random noise.

Many known methods may be used to remove/attenuate the random noise $r(\omega,r_i)$. As such, the description below is focused on preserving the desired reflection signal $s(\omega,r_i)$ while attenuating the coherent noise $c(\omega,r_i)$.

The desired reflection signal $s(\omega,r_i)$ and the coherent noise $c(\omega,r_i)$ can be written as:

$$s(\omega, r_i) = f_{lp}^s(\omega, r)a_{lp}^s(\omega) + \sum_{n=1}^{N} f_n^s(\omega, r_i)a_n^s(\omega) \quad \text{Eq. 2}$$

and $$c(\omega, r_i) = \sum_{m=1}^{M} f_m^c(\omega, r_i)a_m^c(\omega) \quad \text{Eq. 3}$$

where:
$f_{lp}^s(\omega,r_i)$, $f_n^s(\omega,r_i)$ and $f_m^c(\omega,r_i)$ are time delay and advance operators (e.g. plane waves) and $\alpha(\omega)$ are weighting factors.

The weighting factors $\alpha(\omega)$ in Eq. 2 and Eq. 3 are determined in embodiments of the present invention by minimizing the cost function defined as $$\phi(\omega) = \sum_{i=1}^{K} [d(\omega, r_i) - f^H(\omega, r_i)a(\omega)]^2 \quad \text{Eq. 4}$$

where:
$$f(\omega, r_i) = [\, f_{lp}^s(\omega, r_i) \quad f_1^s(\omega, r_i) \quad \ldots \quad f_N^s(\omega, r_i) \quad f_1^c(\omega, r_i) \quad \ldots \quad f_M^c(\omega, r_i) \,]^H$$

and $$a(\omega) = [\, a_{lp}^s(\omega) \quad a_1^s(\omega) \quad \ldots \quad a_N^s(\omega) \quad a_1^c(\omega) \quad \ldots \quad a_M^c(\omega) \,]^H$$

The optimal solution of $\alpha(\omega)$ can be found from:

$$a(\omega) = \left( \sum_{i=1}^{K} f(\omega, r_i) f^H(\omega, r_i) \right)^{-1} \sum_{i=1}^{K} f(\omega, r_i) d(\omega, r_i) \quad \text{Eq. 5}$$

In embodiments of the present invention, the time delay and advance operator $f_{lp}^s(\omega,r_i)$ is designed as a low pass fan filter by specifying a stop velocity. In embodiments of the present invention, $f_n^s(\omega,r_i)$ and $f_m^c(\omega,r_i)$ are designed as band pass fan filters by specifying a velocity range of reflection signals or noises. These velocities/velocity ranges may, in aspects of the present invention, be determined from recorded traces. In embodiments of the present invention, the 3D filters are applicable to target traces (target receivers) and the surrounding traces (receivers).

In land seismic surveys, the ground roll and its scattered waves may be recorded along with the reflection signals from deep reflectors by geophones planted at the surface. Therefore, in embodiments of the present invention, in order to make the fan filter able to attenuate both the ground roll and its scattered waves, the time delay and advance operators $f_{lp}(\omega,r_i)$ and $f(\omega,r_i)$ are designed by specifying symmetric positive and negative velocity ranges, which can be written as:

$$f_{lp}(\omega, r_i) = \int_{-k_s}^{-k_p} (\text{taper})e^{-jk \cdot r_i} dk + \int_{-k_p}^{k_p} e^{-jk \cdot r_i} dk + \int_{k_p}^{k_s} (\text{taper})e^{-jk \cdot r_i} dk \quad \text{Eq. 6}$$

and $$f(\omega, r) = \int_{-k_4}^{-k_3} (\text{taper})e^{-jk \cdot r_i} dk + \int_{-k_3}^{-k_2} e^{-jk \cdot r_i} dk + \int_{-k_2}^{-k_1} (\text{taper})e^{-jk \cdot r_i} dk + \int_{k_1}^{k_2} (\text{taper})e^{-jk \cdot r_i} dk + \int_{k_2}^{k_3} (\text{taper})e^{-jk \cdot r_i} dk + \int_{k_3}^{k_4} (\text{taper})e^{-jk \cdot r_i} dk \quad \text{Eq. 7}$$

where:

k is the wavenumber vector;

$k_p = \omega/v_{pass}$;

$k_s = \omega/v_{stop}$;

$k_1 = \omega/v_{max}$;

$k_2 = \omega/v_{maxf}$;

$k_4 = \omega/v_{min}$;

$v_{pass}$ specifies the velocity of the passband;

$v_{stop}$ specifies the velocity of the stopband for the low pass operator $f_{lp}(\omega, r_i)$; and $v_{max}$, $v_{maxf}$, $v_{minf}$ and $v_{min}$ specify the apparent velocity range for the band-pass operator $f(\omega, r_i)$.

Figure 2:
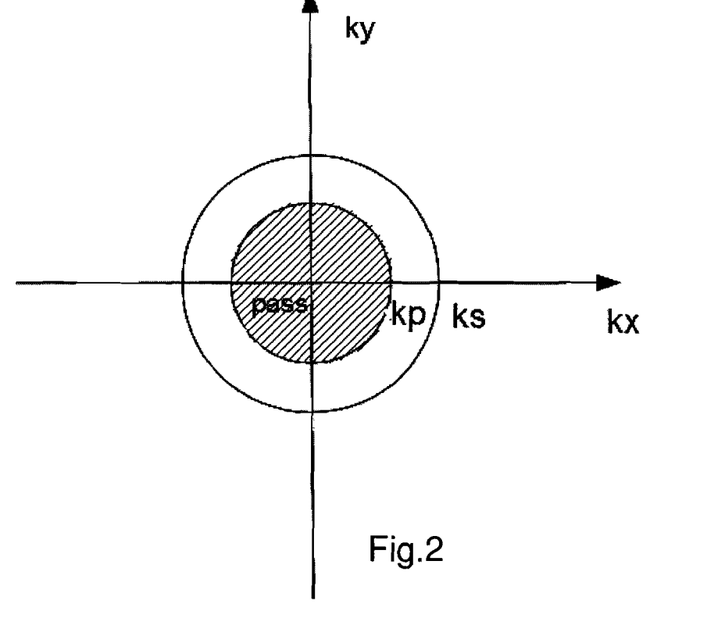
FIG. 2 illustrates an example of a 3D low-pass fan filter in wavenumber domain, in accordance with an embodiment of the present invention.
Figure 3:
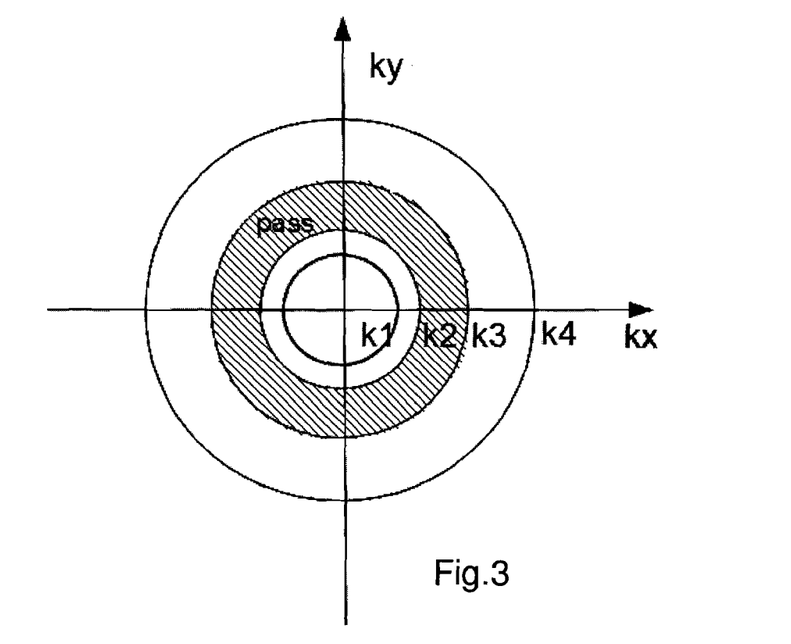
FIG. 3 illustrates an example of a 3D band-pass fan filter in wavenumber domain, in accordance with an embodiment of the present invention.

In embodiments of the present invention, the various velocities v or equivalent wavenumbers $k_1$-$k_4$ may be user determined parameters, which may be estimated from seismic data to be processed or from prior knowledge about the survey area. These parameters are related to the noises to be attenuated. If the taper function in Eq. 6 and Eq. 7 is a raised cos function and the frequency response is circularly symmetric low-pass or band-pass filter, as shown in FIG. 2 and FIG. 3, the operators $f_{lp}(\omega, r_i)$ and $f(\omega, r_i)$ can be calculated using:

$$\int_{k_p}^{k_s} k\cos(\alpha k) J_0(kr) dk = \sum_{n=0}^{\infty} \int_{k_p}^{k_s} k \frac{(-1)^n}{(2n)!} (\alpha k)^{2n} J_0(kr) dk \qquad \text{Eq. 8}$$

and $$s_n = \int k^n J_0(kr) dk = \frac{k^n}{r} J_1(kr) + \frac{n-1}{r^2} k^{n-1} J_0(kr) - \left(\frac{n-1}{r}\right)^2 s_{n-2} \qquad \text{Eq. 9a}$$

$$s_1 = \int k J_0(kr) dk = \frac{k}{r} J_1(kr) \qquad \text{Eq. 9b}$$

where:

$k = \sqrt{k_x^2 + k_y^2}$; and $r = \sqrt{(x_i - x_0)^2 + (y_i - y_0)^2}$, which is the distance between the $i^{th}$ geophone and the primary geophone (the trace to be filtered). This calculation may be computationally extensive.

FIGS. 2 and 3 illustrate two 3D filters, in accordance with embodiments of the present invention, one for low-pass filtering and one for band-pass filtering. As depicted in FIG. 2, when the magnitude of the wavenumber (spatial frequency) is less than the pass frequency $k_p$, the filter allows full passage of data/signals, when the magnitude of the wavenumber is above the stop frequency $k_s$, there is no passage of data/signals, and when the magnitude of the wavenumber is in between (i.e. in the tapering band), there is partial passage of data/signals. The full passage, no passage and partial passage of the filters may be better illustrated for 2D filters.

Figure 4:
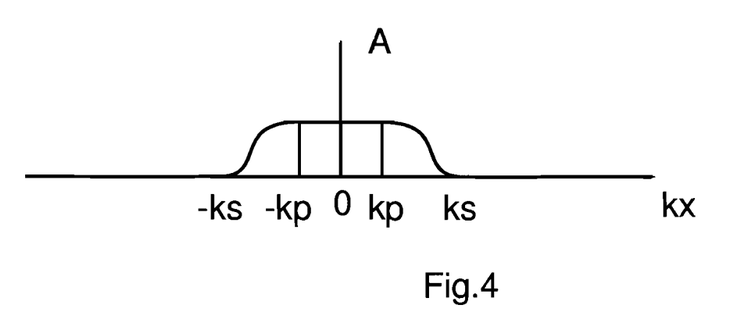
FIG. 4 illustrates an example of a 2D low-pass fan filter in wavenumber domain, in accordance with an embodiment of the present invention.
Figure 5:
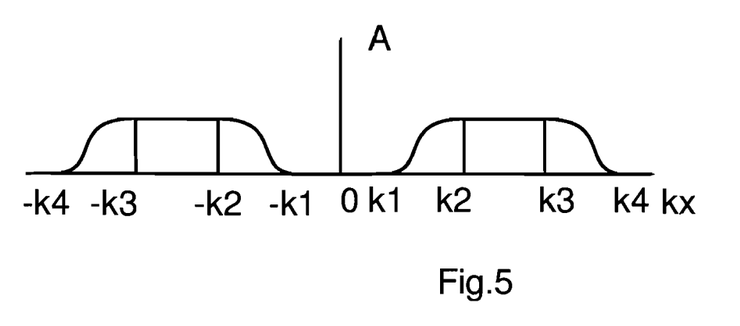
FIG. 5 illustrates an example of a 2D band-pass fan filter in wavenumber domain, in accordance with an embodiment of the present invention.

FIGS. 4 and 5 illustrate two 2D filters comparable to the filters illustrated in FIGS. 2 and 3. In the examples depicted in FIGS. 4 and 5, the filters are oriented/disposed along the inline-direction of a receiver line in a Cartesian coordinate system.

In FIG. 4, a horizontal axis is the axis for wavenumber in inline –direction and the vertical axis is the filter passage amplitude. In the depicted 2D low-pass filter, in accordance with an embodiment of the present invention, when the wavenumber (spatial frequency) is between $-k_p$ and $k_p$ (or the magnitude of spatial frequency is less than the pass-frequency), the filter allows full passage; when the wavenumber is between $(-k_s, -k_p)$ and $(k_p, k_s)$ (or the magnitude of the spatial frequency is between the pass-frequency and the stop-frequency), the passage is partial; when the wavenumber is outside $-k_s$ and $k_s$ (or the magnitude of spatial frequency is greater than the stop-frequency), the filter allows no passage. In this example, the tapering follows a raised cos function. Tapering may follow many other suitable functions, e.g. a linear, a quadratic, or a hyperbolic tangent curve etc.

FIG. 5 illustrates a 2D band-pass filter, in accordance with an embodiment of the present invention, also along the inline direction of a receiver line. The filter is a mirror image for the positive wavenumber and the negative wavenumber (spatial frequency). For a positive wavenumber, when it is less than k4 or greater than k1, there is no passage; when it is greater than k3 and less than k2, there is full passage; when it is between the no passage zone and the full pages zone, there is partial passage as shown in FIG. 5. The tapering follows raised cos function in this example.

In embodiments of the present invention, 2D filters may filter along any 1-dimensional curve. FIGS. 4 and 5 illustrate filtering along inline direction of a receiver line. 2D filters may filter along the inline or cross-line direction of a receiver line in a Cartesian coordination system; or they may filter along the radius (offset) or azimuth (angle) in a polar-coordination system; or they may filter along a user defined curve. The relevant parameters shown in these figures are discussed above. The related spatial frequencies (wavenumbers) may be determined from data (the traces being filtered) or be specified by an operator from prior knowledge. For traces that are close by, the filters can stay the same. If the traces are far apart, in embodiments of the present invention, then new filters based on the new trace data may be created.

In embodiments of the present invention, the time delay and advance operators $f_{lp}(\omega, r_i)$ and $f(\omega, r_i)$ may be designed by using an ideal spectrum response. Thus the operators may be formulated as:

$$f_{lp}(\omega, r_i) = \int_{-k_{yp}}^{k_{yp}} e^{-jk \cdot r_i} dk = \int_0^{k_p} k J_0(kr) dk = \frac{k_p}{r} J_1(k_p r) \qquad \text{Eq. 10}$$

$$f(\omega, r_i) = \int_{k_p}^{k_s} k J_0(kr) dk = \frac{k_s}{r} J_1(k_s r) - \frac{k_p}{r} J_1(k_{pr}) \qquad \text{Eq. 11}$$

When filtering seismic data using a local areal array, as described above, the waves propagated from the seismic source(s) to the seismic receivers in the array may be mapped into the waves propagated from the primary trace to the other traces in the array. Therefore, the velocities of waves propagated from the source to the receivers may be mapped/are mapping into the velocities of waves propagated from the primary trace to the other traces in the array. In the far field, the difference between the velocity propagated from the source to the receivers in the seismic array and the mapped velocity is negligible. However, this difference becomes bigger when the distance between the source and receivers in the array is smaller. In consequence, some amount of noise may not be attenuated by the 3D fan filter designed, in accordance with an embodiment of the present invention, using Eq. 10 and Eq. 11. Consequently, in some embodiments of the present invention, a 2D fan filter that uses the distance between the source and receiver may be applied/used to attenuate noise, which is not attenuated by the 3D fan filter designed, in accordance with an embodiment of the present invention, using Eq. 10 and Eq. 11. In an embodiment of the present invention, the 2D fan filter may be applied before or after the 3D fan filtering.

In 2D fan filtering, the time delay and advance operators (basis functions), $f_{lp}(\omega,x_i)$ and $f(\omega,x_i)$, may be designed by specifying symmetric positive and negative velocity ranges and can be formulated as:

$$f_{lp}(\omega, x_i) = \int_{-k_s}^{-k_p}(\text{taper})e^{-jk\cdot x_i}dk + \int_{-k_p}^{k_p}e^{-jk\cdot x_i}dk + \int_{k_p}^{k_s}(\text{taper})e^{-jk\cdot x_i}dk \quad \text{Eq. 12}$$

and $$f(\omega, x_i) = \int_{-k_4}^{-k_3}(\text{taper})e^{-jk\cdot x_i}dk + \int_{-k_3}^{-k_2}e^{-jk\cdot x_i}dk + \int_{-k_2}^{-k_1}(\text{taper})e^{-jk\cdot x_i}dk + \int_{k_1}^{k_2}(\text{taper})e^{-jk\cdot x_i}dk + \int_{k_2}^{k_3}(\text{taper})e^{-jk\cdot x_i}dk + \int_{k_3}^{k_4}(\text{taper})e^{-jk\cdot x_i}dk \quad \text{Eq. 13}$$

where:
$x_i$ is the source-receiver distance;
k is the wavenumber;
$k_1 = \omega/v_{max}$;
$k_2 = \omega/v_{maxf}$;
$k_3 = \omega/v_{minf}$;
$k_4 = \omega/v_{min}$; and
$v_{max}$, $v_{maxf}$, $v_{minf}$ and $v_{min}$ specify the apparent velocity range of the noise.

The f-k spectrum of the low-pass filter and the band-pass filter, in accordance with an embodiment of the present invention, are shown as in FIGS. 4 and 5. In embodiments of the present invention, by using the raised cos function as the taper in Eq. 12 and Eq. 13, the $f_{lp}(\omega,x_i)$ and $f(\omega,x_i)$ can be solved analytically and can be written as $$f_{lp}(\omega, x_i) = -\frac{1}{x_i\left(\left(\frac{x_i(k_s - k_p)}{\pi}\right)^2 - 1\right)}(\sin(k_p x_i) + \sin(k_s x_i)) \quad \text{Eq. 14}$$

and $$f(\omega, x_i) = -\frac{1}{x_i\left(\left(\frac{x_i(k_4 - k_3)}{\pi}\right)^2 - 1\right)}(\sin(k_3 x_i) + \sin(k_4 x_i)) + \frac{1}{x_i\left(\left(\frac{x_i(k_2 - k_1)}{\pi}\right)^2 - 1\right)}(\sin(k_2 x_i) + \sin(k_1 x_1)) \quad \text{Eq. 15}$$

In one embodiment of the present invention, to avoid the numerical instability during numerical computation and reduce the amount of computation, in a few special situations as described below, Eq. 14 and Eq. 15 may be simplified as:
a) When $x_i=0$, $$f_{lp}(\omega,x_i)=k_p+k_s \quad \text{Eq. 16}$$

and $$f(\omega,x_i)=k_4+k_3-k_2-k_1 \quad \text{Eq. 17}$$

b) When $(x_i(k_s-k_p)/\pi)^2=1$ $$f_{lp}(\omega,x_i)=-\frac{1}{2}(k_p\cos(k_p x_i)+k_s\cos(k_s x_i)) \quad \text{Eq. 18}$$

c) When $(x_i(k_4-k_3)/\pi)^2=1$ $$f(\omega, x_i) = -\frac{1}{2}(k_3\cos(k_3 x_i) + k_4\cos(k_4 x_i)) + \frac{1}{x_i\left(\left(\frac{x_i(k_2 - k_1)}{\pi}\right)^2 - 1\right)}(\sin(k_2 x_i) + \sin(k_1 k_i)) \quad \text{Eq. 19}$$

d) When $(x_i(k_2-k_1)/\pi)^2=1$ $$f(\omega, x_i) = -\frac{1}{x_i\left(\left(\frac{x_i(k_4 - k_3)}{\pi}\right)^2 - 1\right)}(\sin(k_3 x_i) + \sin(k_4 x_i)) + \frac{1}{2}(k_2\cos(k_2 x_i) + k_1\cos(k_1 x_i)) \quad \text{Eq. 20}$$

For selected low-pass and band-pass filters, 2D or 3D, in embodiments of the present invention, their basis functions may be designed by analytically solving the integration of the specified 3D frequency-wavenumber spectrum of both the noise and the reflection signals. The basis functions may be designed/used for both signals and noise.

Embodiments of the present invention may provide methods to attenuate ground noise. Using the formulation discussed above, in an embodiment of the present invention, 2D or 3D filters may be designed by numerical solution or analytical solution. One of the methods, in accordance with an embodiment of the present invention, to attenuate ground roll noise may be summarized as method 700 in FIG. 7, which method provides the following:
  transforming the data from time-space domain into frequency-space domain (710);
  designing filters with basis functions (720), where the designing filters (720) may be summarized as:
    selecting an operator length, velocity band(s) of the signal, velocity band(s) of noise, and a frequency range that the filter will be applied to (712);
    selecting a primary trace (the trace needs to be filtered), and select relevant traces adjacent to the primary trace within the specified operator length (714);
    computing fan filter(s) for the signal and fan filter(s) for the noise at a frequency (716);
    computing the weighting factors, e.g. by Eq. 5 (718);
  decomposing data using filters at the selected frequency (730);
  filtering the noise, i.e. compute the filtered data by setting the weighting factors of the noise band(s) to zero (740);
  repeating the last two operations (730 and 740) until relevant frequencies have been filtered for the primary trace (750);
  selecting another trace as a primary trace and repeating last three operations (730-750) until relevant traces have been filtered (760); and
  transforming the data from frequency-space domain into time-space domain (770).

Figure 7:
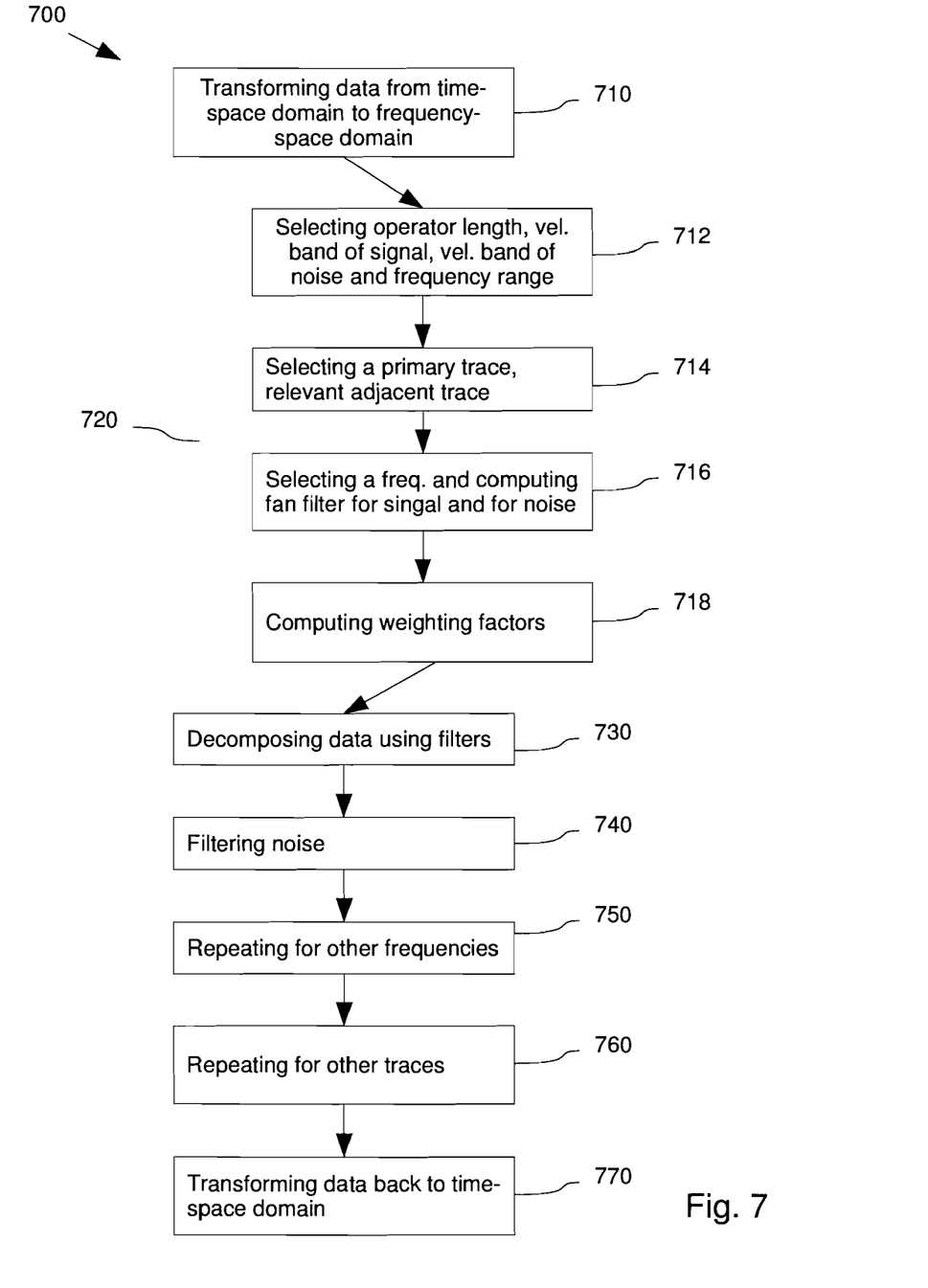
FIG. 7 illustrates a flow diagram of a method used to attenuate ground roll and scattered ground roll noises with 2D or 3D fan filters, in accordance with an embodiment of the present invention.

In the method 700 in FIG. 7, in accordance with an embodiment of the present invention, the operator length, velocity bands of the signal, velocity bands of noise and a frequency range may be selected by a geophysicist based on his knowledge of the survey data, or the parameters may be selected based on the survey data. In some aspects, the parameters may be selected based on the type of noises to be filtered.

In the illustrated method 700, the parts of data (e.g. the frequency band in a trace or traces, a few traces among the survey data) that are identified as noise are filtered and the other parts of the data are not impacted. Depending on the seismic data to be processed, in aspects of the present invention, different fan filters may be used and/or the fan filters may be applied differently.

In embodiments of the present invention, where 3D data is being processed and where the data is collected from 2D areal point-receiver arrays and 2D areal sources arrays, 3D fan filters (e.g. low-pass and/or band-pass), as described above, are used to attenuate the noise in the data. In some aspects, the 3D data may also be acquired from a cross-spread point-receiver arrangement. In embodiments of the present invention, the 3D filters may be used repeatedly on the data. For each pass, the filters may be kept the same or adjusted according to the remaining noise. In embodiments of the present invention, for similar 3D data, a 2D fan filter (e.g. low-pass and/or band-pass), as described above, may be used instead of the 3D fan filter. In embodiments of the present invention, the 2D filters may be used repeatedly. For each pass, the filters may be kept the same or adjusted according to the noise. As mentioned previously when describing the 2D and 3D fan filters, the fan filters may have different characteristics and may be configured to target different noise in the data. Additionally, in embodiments of the present invention, the 2D and 3D filters may be used sequentially, e.g. filtering the data with the 2D filter(s) followed by filtering the data with the 3D filter(s). In another filter sequence, the data may be filtered by a 3D filter(s) and then by a 2D filter(s) In embodiments of the present invention, the 2D and/or 3D filters may be applied repeatedly to the data.

For 2D data, where the data is collected from a 1D receiver line(s) (e.g. a line point-receiver array) or 1D source lines, in embodiments of the present invention, 2D filters may be used and applied repeatedly. The 2D data may be data collected from 3D dataset along a specific line or curve, for example, a 3D cross-spread point-receiver data may be sorted into a 2D dataset with common azimuth angle gathers. Then, the 2D fan filters may be applied to each azimuth angle gather. In another example, 3D data may be sorted into common offset gathers to obtain a 2D dataset.

Figure 8:
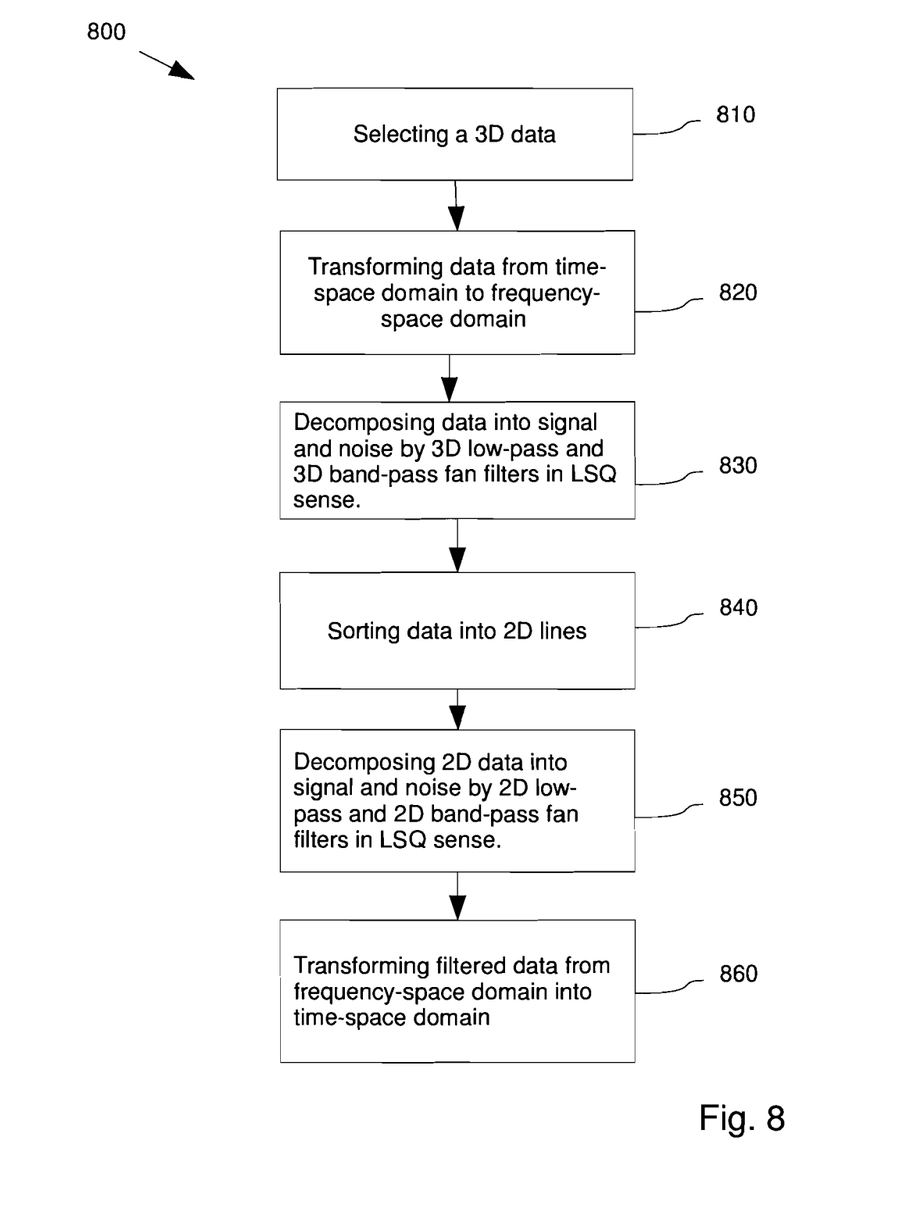
FIG. 8 illustrates a flow diagram of another method used to attenuate ground roll and scattered ground roll noises by cascading 2D and 3D fan filters, in accordance with an embodiment of the present invention.

Another method of noise attenuation, in accordance with an embodiment of the present invention, method 800 in FIG. 8, may be summarized as:

Selecting a 3D data, for example, a cross-spread gather or an areal point-receiver array (810);

Transforming the seismic data from time-space domain into frequency-space domain, (820);

Decomposing the seismic data into 'signal' and 'noise' by 3D low-pass fan filter and 3D band-pass fan filter(s) in least-square sense for a 3D seismic data (830);

Sorting data into 2D lines, for example, a line point-receiver array, or sort the cross-spread point-receiver acquired data into common azimuth angle gathers and apply the filter for each azimuth angle gathers (840);

Decomposing the seismic data into 'signal' and 'noise' by 2D low-pass fan filter and 2D band-pass fan filter(s) in least-square sense for a 2D seismic data (850); and Transforming filtered data from frequency-space domain into time-space domain (860).

In embodiments of the present invention, the decomposing of seismic data into "signal" and "noise" data by filters may be done using any of the formulations discussed above, e.g. as in Eq. 1 to Eq. 3 and a cost function may be minimized, as illustrated in/provided by Eq. 4, which is a generalized least-square cost function. Once the cost function is minimized, in embodiments of the present invention, the time delay and advance operators (the "basis functions") and/or the weighing factors are obtained. If, in an embodiment of the present invention, the taper functions for the filters are selected to be raised cos functions, as discussed above, time delay and advance operators or base functions may be derived analytically as Bessel functions.

In the method 800, 3D filters may be used first (830) and then 2D filters may be applied (850). As discussed above, the 3D filters and 2D filters may be used independently, in a sequence where 3D filters are used first followed by 2D filters, or in a sequence where 2D filters are used first followed by 3D filters. The two types of filters may also be used repeatedly in different sequences based on the characteristics of the data.

In embodiments of the present invention, the above methods may be used to attenuate ground roll (or similar types of noise) from seismic (land, ocean bottom or marine) data using 3D acquisition geometries. For example: areal receiver arrays and cross-spread point-receiver acquisition may be used on land data.

In the methods described above, the operator length may be specified as a number of receivers in a receiver line, as a number of sources in a source line, by specifying the velocity range of reflection signals and/or the velocity range of the ground roll. In embodiments of the present invention, the basis functions may be calculated, for example by using the Bessel function. In embodiments of the present invention, the optimal coefficients of decomposition may be solved by minimizing the misfit between the recorded data and the decomposed components in the least-square sense, e.g. as provided in Eq. 4. In embodiments of the present invention, a local overlapping cross-spread spatial window can be used in the decomposition to minimize the 'smear' effect observed with long spatial operators. In some embodiments of the present invention, the spatial apertures of the operator may be varied with frequency in order to achieve optimal performance at all frequencies, while minimizing the computation time.

In embodiments of the present invention, the filters may be based on signal decomposition and may handle any geometry, regular or irregular. In aspects of the present invention, when the data is acquired from a regular geometry, the fan filters may be designed using/based upon the regular geometry. For 2D fan filters, the operators can be designed by using regular positions, such as a line point-receiver array with a constant receiver interval. For 3D fan filters, the operators can be designed using regular positions and an areal point-receiver array with a constant receiver interval in both in-line direction and cross-line direction. The positions used for designing the operators may be the same positions from which the data is/was acquired.

In embodiments of the present invention, if the data is acquired from an irregular geometry arrangement, for example due to operating constraints, the data may still be filtered using the fan filters described above. One way to do apply the filters to irregularly acquired data is to regularize the data using one or more regularization methods. For example, the trace which is closest to the regular position may be selected, or an average of traces adjacent to the regular position bounded by the nearby regular positions may be used. Another regularization method that may be used is the Yen-4 theorem. In embodiments of the present invention, once the data is transformed into a regular geometry, fan filters designed for regular geometry applications may be used.

In accordance with an embodiment of the present invention, another way to filter irregular data is to design filters that follow the irregular geometry of the survey. The same source positions and receiver positions used in acquiring the data may be used as positions when designing the 2D or 3D filters. It should be noted that the filters designed in accordance with the methods discussed above may be independent of the source/receiver positions.

In embodiments of the present invention, once the data is filtered by at least one of the fan filters described above and the noise level has been attenuated below an acceptable threshold, the data may be processed further for other purposes. In embodiments of the present invention, the noise attenuated data may be used to generate images of an interior of the Earth. Such images may reveal the subsurface structures of the Earth, some of which may be reservoirs containing hydrocarbons, fresh water or other valuable materials.

Figure 6A:
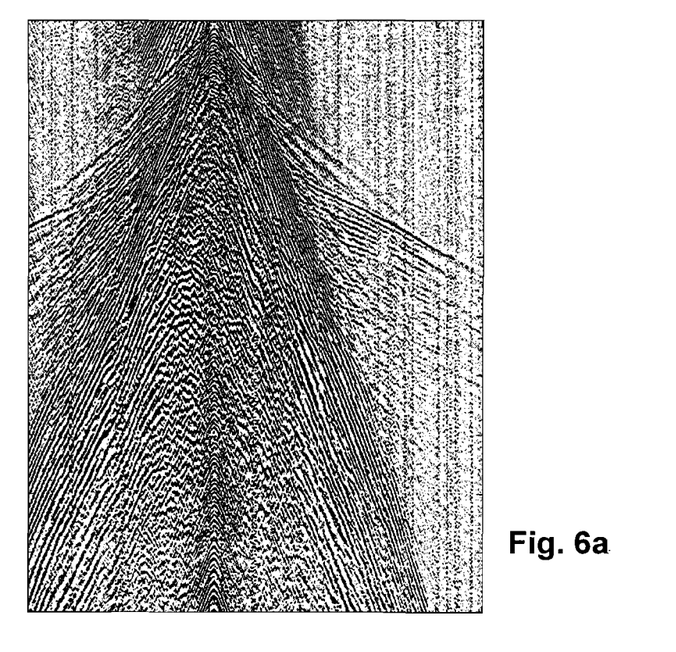
FIGS. 6a-6c illustrate an example of results using a method in accordance with an embodiment of the present invention.
Figure 6B:
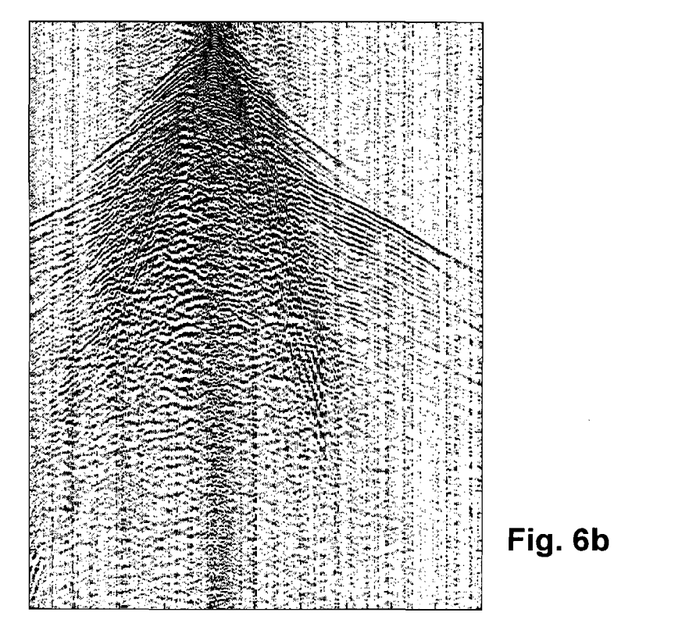
Figure 6C:
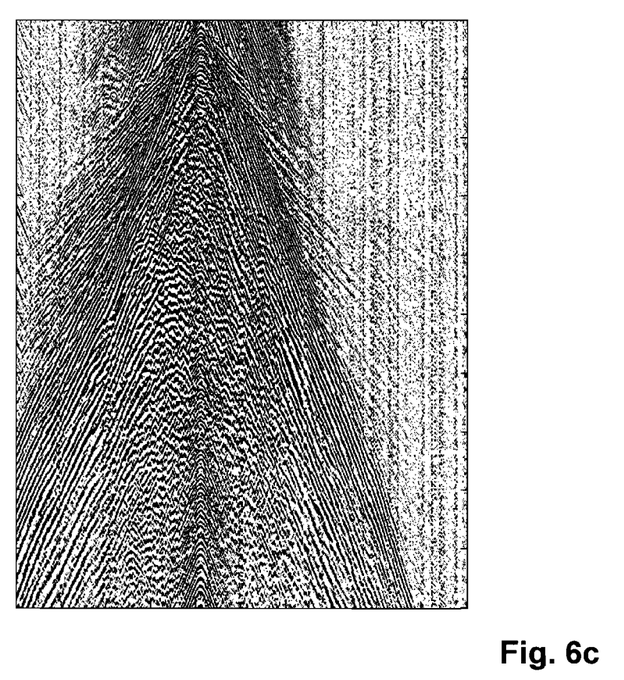

FIGS. 6a, 6b and 6c show an example of noise attenuation by cascading (sequential application) a 2D fan filter with a 3D fan filter, as described above, in accordance with an embodiment of the present invention. There are 32 receiver lines in this example of a one shot gather and an areal receiver array. In the embodiment of the present invention, a 2D fan filter is applied first to each receiver line, then a 3D 31×31 fan filter is applied. The middle receiver line is processed and displayed in FIGS. 6a-6c. FIG. 6a shows the raw data; FIG. 6b shows the filtered data and FIG. 6c shows the difference, which is calculated by subtracting FIG. 6b from FIG. 6a. It is noted that the high amplitude ground roll and scattered ground roll observed in FIG. 6a are attenuated, and both strong and weak reflection signals are well preserved (little reflection energy leaks in to the difference as shown in FIG. 6c). The figure shows that the filtering methods of the present invention may provide for attenuating ground roll and scattered ground roll noise from seismic data while preserve the reflection signals in the filtered data. The methods in accordance with embodiments of the present invention are numerically stable and efficient.

As those with skill in the art will understand, one or more of the steps of methods discussed above may be combined and/or the order of some operations may be changed. Further, some operations in methods may be combined with aspects of other example embodiments disclosed herein, and/or the order of some operations may be changed. The process of measurement, its interpretation, and actions taken by operators may be done in an iterative fashion; this concept is applicable to the methods discussed herein. Finally, portions of methods may be performed by any suitable techniques, including on an automated or semi-automated basis such as on computing system 900 in FIG. 9.

Portions of methods described above may be implemented in a computer system 900, one of which is shown in FIG. 9. The system computer 930 may be in communication with disk storage devices 929, 931, 933 and 935, which may be external hard disk storage devices and measurement sensors (not shown). It is contemplated that disk storage devices 929, 931, 933 and 935 are conventional hard disk drives, and as such, may be implemented by way of a local area network or by remote access. While disk storage devices are illustrated as separate devices, a single disk storage device may be used to store any and all of the program instructions, measurement data, and results as desired.

In one implementation, real-time data from the sensors may be stored in disk storage device 931. Various non-real-time data from different sources may be stored in disk storage device 933. The system computer 930 may retrieve the appropriate data from the disk storage devices 931 or 933 to process data according to program instructions that correspond to implementations of various techniques described herein. The program instructions may be written in a computer programming language, such as C++, Java and the like. The program instructions may be stored in a computer-readable medium, such as program disk storage device 935. Such computer-readable media may include computer storage media. Computer storage media may include volatile and non-volatile media, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 930. Combinations of any of the above may also be included within the scope of computer readable media.

In one implementation, the system computer 930 may present output primarily onto graphics display 927, or via printer 928 (not shown). The system computer 930 may store the results of the methods described above on disk storage 929, for later use and further analysis. The keyboard 926 and the pointing device (e.g., a mouse, trackball, or the like) 925 may be provided with the system computer 930 to enable interactive operation.

The system computer 930 may be located on-site, e.g. as part of data collection system 140 as in FIG. 1 or at a data center remote from the field. The computer system 930 may be connected with other systems via network link 924. The system computer 930 may be in communication with equipment on site to receive data of various measurements. Such data, after conventional formatting and other initial processing, may be stored by the system computer 930 as digital data in the disk storage 931 or 933 for subsequent retrieval and processing in the manner described above.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

The invention claimed is:

1. A method for attenuating coherent ground roll noise while preserving reflection signals in seismic data, the method comprising:

(a) transforming the seismic data from time-space domain into frequency-space domain;
(b) designing the fan filters with basis functions wherein the step of designing the filters comprises:
   selecting an operator length, a velocity band of the signals, a velocity band of the noises, and a frequency range;
   selecting a primary trace and adjacent traces to the primary trace within the operator length;
   computing fan filters for the signals and fan filters for the noise for a frequency;
   computing weighing factors;
(c) decomposing the data using the fan filters into the signals and the noise at the frequency;
(d) filtering the noise from the decomposed data;
(e) repeating steps (c) and (d) for a plurality of frequencies for the primary trace;
(f) repeating steps (c), (d) and (e) one or more adjacent traces; and
(g) transforming the filtered data from the frequency-space domain into the time-space domain.

2. The method of claim 1, wherein the fan filters comprise either 2D low-pass fan filters and 2D band-pass fan filters or 3D low-pass fan filters and 3D band-pass fan filters.

3. The method of claim 2, wherein the decomposing the seismic data using the fan filters into signals and noise at the frequency comprises at least one of: decomposing the data using the 2D filters; decomposing the data using the 3D filters; decomposing the data using the 2D filters followed by the 3D filters; decomposing the data using the 3D filters followed by the 2D filters; decomposing the data using the 2D filters at least twice; or decomposing the data using the 3D filters at least twice.

4. The method of claim 1, wherein the data is acquired using seismic receivers disposed at regular positions, and the method further comprises:
   designing one or more operators using the regular positions.

5. The method of claim 1, wherein the data is acquired using seismic receivers or sources disposed at irregular positions, the method further comprising:
   designing one or more operators using the irregular positions.

6. The method of claim 1, wherein the data is acquired from seismic receivers or sources disposed at irregular positions and the method further comprises:
   regularizing the data from the irregular positions to regular positions; and
   designing one or more operators using the regular positions.

7. The method of claim 6, wherein regularizing the data from the irregular positions to the regular positions comprises:
   selecting a trace that is closest to one of the regular positions; or
   determining an average of traces adjacent to one of the regular positions that is bounded by nearby, regular positions.

8. The method of claim 6, wherein regularizing the data from the irregular positions to the regular positions comprises:
   using a method based on a Yen-4 theorem to regularize the data.

9. The method of claim 1, further comprising:
   using the filtered data for at least one of generating an image of an interior section of the Earth and determining properties of an interior section of the Earth.

10. The method of claim 1, wherein the basis functions comprise Bessel functions.

11. The method of claim 1, wherein the operator length is equal to a number of receivers in a receiver line or a number of sources in a source line.

12. A data processing system for processing seismic data using fan filters to attenuate coherent ground roll noise from the seismic data while preserving reflection signals in the seismic data, the system comprising:
   a processor; and
   computer readable storage containing simultaneous source data and computer executable instructions which when executed by the processor, cause the processor to:
   (a) transform the seismic data from a time-space domain into a frequency-space domain;
   (b) design the fan filters with basis functions, wherein the step of designing the filters comprises:
      selecting an operator length, a velocity band of the signals, a velocity band of the noises, and a frequency range;
      selecting a primary trace and adjacent traces to the primary trace within the operator length;
      computing fan filters for the signals and fan filters for the noise for a frequency;
      computing weighing factors;
   (c) decompose the data using the fan filters into the signals and the noise at the frequency;
   (d) filter the noise;
   (e) repeat steps (c) and (d) of decomposing and filtering until relevant frequencies have been filtered for the primary trace;
   (f) repeat steps (c), (d) and (e) until relevant adjacent traces have been filtered; and
   (g) transform the data from the frequency-space domain into the time-space domain.

13. The data processing system of claim 12, wherein the fan filters are 2D low-pass fan filters and 2D band-pass fan filters, or wherein the fan filters are 3D low-pass fan filters and 3D band-pass fan filters.

14. The data processing system of claim 13, wherein the step of decomposing the data using the fan filters into signals and noises at the frequency comprises at least one of:
   decomposing the data using the 2D filters;
   decomposing the data using the 3D filters;
   decomposing the data using the 2D filters followed by the 3D filters;
   decomposing the data using the 3D filters followed by the 2D filters;
   decomposing the data using the 2D filters at least twice; and
   decomposing the data using the 3D filters at least twice.

15. The data processing systems of claim 12, wherein the data is acquired from irregular positions and the processor is configured to design operators using the irregular positions.

16. The data processing systems of claim 12, wherein the data is acquired from irregular positions, and the processor is configured to regularize data from the irregular positions to regular positions and design operators using the regular positions.

17. The data processing systems of claim 16, wherein to regularize the data from the irregular positions to the regular positions the processor is configured to select a trace which is closest to a one of the regular position; or select an average of traces adjacent to a one of the regular position that is bounded by a plurality of nearby regular positions.

18. The data processing systems of claim 16, wherein regularizing the data from the irregular positions to the regular positions comprises:

using a data processing system based on a Yen-4 theorem.

19. The data processing systems of claim 12, wherein the basis functions comprise Bessel functions.

20. The data processing systems of claim 12, wherein the operator length is equal to at least one of a number of receivers in a receiver line and a number of sources in a source line.

21. The data processing systems of claim 12, wherein the processor is configured to process the filtered data to generate an image of an interior section of the Earth or process parameters to describe properties of the interior section of the Earth.

* * * * *